(12) United States Patent
Gaigler

(10) Patent No.: US 7,762,194 B2
(45) Date of Patent: Jul. 27, 2010

(54) APPARATUS COMPRISING A PAYLOAD EJECTION MECHANISM

(75) Inventor: Randy L. Gaigler, Parkville, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 359 days.

(21) Appl. No.: 11/531,200

(22) Filed: Sep. 12, 2006

(65) Prior Publication Data

US 2008/0078887 A1 Apr. 3, 2008

(51) Int. Cl.
*F42B 12/58* (2006.01)

(52) U.S. Cl. .................. 102/357; 244/173.2

(58) Field of Classification Search ... 244/173.1–173.3, 244/171.7; 89/1.816, 1.817, 196; 188/300; 267/160, 169, 175, 176; 102/489, 393, 340, 102/342, 351, 357

See application file for complete search history.

(56) References Cited

U.S. PATENT DOCUMENTS

| | | | | |
|---|---|---|---|---|
| 3,262,655 A | * | 7/1966 | Gillespie, Jr. ............ | 244/173.1 |
| 5,317,975 A | * | 6/1994 | Sauvestre et al. .......... | 102/489 |
| 5,431,106 A | * | 7/1995 | Dunn et al. ................. | 102/489 |
| 6,227,493 B1 | * | 5/2001 | Holemans ................ | 244/173.1 |
| 6,343,770 B2 | * | 2/2002 | Holemans ................ | 244/173.3 |
| 6,357,699 B1 | * | 3/2002 | Edberg et al. ............ | 244/173.3 |
| 6,499,909 B1 | * | 12/2002 | Scheidling et al. ......... | 403/351 |
| 6,508,437 B1 | * | 1/2003 | Davis et al. .............. | 244/173.2 |
| 6,634,471 B2 | * | 10/2003 | Obst ......................... | 188/284 |
| 6,928,931 B1 | * | 8/2005 | Biser.o slashed.d ......... | 102/377 |

* cited by examiner

*Primary Examiner*—Timothy D Collins
*Assistant Examiner*—Michael Kreiner
(74) *Attorney, Agent, or Firm*—DeMont & Breyer, LLC

(57) ABSTRACT

An apparatus that provides shock absorption and ejection for a payload that is to be deployed from a launch capsule is disclosed. The payload ejection mechanism comprises a movable housing that houses a resilient member and a shock-damping system. The rapid acceleration of the capsule upon launch causes the movable housing to move, which compresses the resilient member, thereby storing energy. Movement of the housing also provides shock damping behavior. A locking mechanism maintains the compression of the resilient member until the capsule opens to deploy the payload. As the capsule opens, a restraint decouples from the locking mechanism and permits the resilient member to expand. Expansion of the resilient member causes the movable housing to move, thereby propelling the payload away from the capsule.

4 Claims, 4 Drawing Sheets

APPARATUS COMPRISING A PAYLOAD EJECTION MECHANISM

FIELD OF THE INVENTION

The present invention relates to munitions or launch capsules and, more particularly, a payload ejection mechanism for use in conjunction with such capsules.

BACKGROUND OF THE INVENTION

Some launch capsules carry payloads that are intended to be separated from the capsule in flight. This familiar process of deploying munitions or the like from a capsule is depicted in FIGS. 1A through 1C.

FIG. 1A depicts the launch of capsule 100. In this illustration, capsule 100 contains booster 108, which provides the thrust required for launch. In this example, the payload is an unmanned aerial vehicle, usually referred to as a "UAV." The UAV is not visible in FIG. 1A since it is within shell 102

At some predetermined altitude or time, shell 102 of capsule 100 opens in preparation for releasing UAV 110, as depicted in FIG. 1B. Typically, explosive bolts or similar mechanisms are used to open the capsule. As the capsule opens, UAV 110 is released from launch restraints so that it is free to separate from the capsule. The release mechanism can be, for example, explosive bolts or the like.

Aerodynamic forces assist with the continued opening of capsule 100 and deployment of UAV 110. More particularly, once capsule 100 partially opens, air resistance forces segments 104 and 106 of shell 102 further apart. The force of the air against segments 104 and 106 also slows capsule 100. Since UAV 110 has been released from its restraints so that it's no longer coupled to the capsule, its forward motion is not retarded at the same rate as capsule 100. As a consequence, UAV 110 separates from the capsule, as depicted in FIG. 1C.

There are several important considerations regarding capsule-deployed payloads. One consideration is that the payload must be able to withstand the axial shock of the capsule's launch. To that end, the launch capsule typically incorporates a shock isolation system that substantially isolates the payload from axially-aligned shock (e.g., due to the high rate of acceleration that is required for launch).

A second consideration relates to the specifics of payload deployment. For some applications, the success of the deployment operation will depend upon how quickly the payload separates from the capsule. In this regard, one concern relates to the presence of debris, which is often produced when the capsule opens. This debris can damage the payload. A second concern applies to payloads that deploy wings to sustain flight. If the payload doesn't rapidly clear the capsule, the wings can be damaged during deployment.

Payload separation can be particularly problematic during low-speed deployments, wherein relatively diminished aerodynamic forces are available to brake the capsule. In such cases, the payload and capsule might not separate enough to permit safe wing deployment or for the payload to clear debris, etc.

There is a need, therefore, for a way to reduce the risks to payloads that are deployed from launch capsules.

SUMMARY OF THE INVENTION

The present invention provides a combined shock absorption and payload ejection mechanism that reduces the risks to capsule-deployed payloads.

In accordance with the illustrative embodiment of the invention, the combined mechanism is disposed within a launch capsule. The mechanism is capable of reducing the shock that a payload would otherwise be exposed to upon launch and is also capable of increasing the separation distance between the payload and capsule upon deployment faster than in the prior art.

In the illustrative embodiment, the payload ejection mechanism comprises a movable housing that houses an energy-storing element. In the illustrative embodiment, the energy-storing element is a resilient member, such as a coil spring. A damping system that includes a piston and cylinder is also at least partially housed within the movable housing.

The payload is disposed on the movable housing. Due to the rapid acceleration of the capsule upon launch, the movable housing moves "downward." Since both the resilient member and the piston are operably coupled to the housing, the downward movement of the movable housing compresses the resilient member and results in further insertion of the piston into the cylinder. The former action stores energy (as potential energy in the compressed spring) and the latter action results in damping that provides shock isolation for the payload.

A locking mechanism maintains the compression of the resilient member until the capsule opens to deploy the payload. As the capsule opens, a restraint decouples from the locking mechanism and permits the resilient member to expand. Expansion of the resilient member causes the movable housing to move. Since the payload is disposed on the movable housing, it is propelled forward, such that the separation distance between the payload and the capsule increases more quickly than in the absence of payload ejection mechanism.

The illustrative embodiment of the invention is an apparatus comprising:

a damping system;

an energy-storing element, wherein energy is stored within the energy-storing via compression of a resilient member; wherein:

(1) in response to a first force, the damping system provides damping action and the energy-storing element stores energy; and (2) the damping system and the energy-storing element are configured so that, in response to the first force, the damping action and the storing of energy occurs substantially simultaneously; and a locking mechanism for maintaining compression of the resilient member.

A method in accordance with the illustrative embodiment of the invention comprises:

compressing a resilient member in response to an accelerating force that accelerates a capsule;

advancing a piston into a cylinder in response to the accelerating force, wherein the compressing and advancing occur substantially simultaneously;

maintaining compression of the resilient member until a shell of the capsule opens;

opening the shell, thereby releasing the compression of the spring.

DETAILED DESCRIPTION

The following terms are defined for use in this specification, including the appended claims:

Operatively-coupled means that the operation, action, movement, etc. of one object affects another object. For example, consider a spring that abuts a plate.

When the plate is moved, downward, the spring is compressed. The plate and the spring are considered to be "operatively-coupled." Operatively-coupled devices can be coupled through any medium (e.g., semiconductor, air, vacuum, water, copper, optical fiber, etc.) and involve any type of force. Consequently, operatively-coupled objects can be electrically-coupled, hydraulically-coupled, magnetically-coupled, mechanically-coupled, optically-coupled, pneumatically-coupled, physically-coupled, thermally-coupled, etc.

Resilient and its inflected forms, refers to a tendency to return to a reference or original state (e.g., shape, position, etc.). Resilience, as a characteristic of a member, can arise in several ways. In some cases, resilience arises from a particular structural configuration (e.g., a coil spring, a cantilever, etc.). In some other cases, the resilience of a member arises due to the nature of the material(s) that form the member (e.g., rubber, etc.). The term "resilient," as used herein, is intended to encompass resilience that arises in any manner.

Figure 1C:
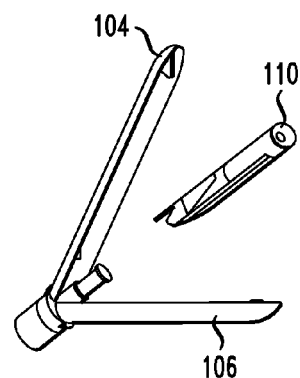
FIGS. 1A through 1C depict the deployment of a payload from a capsule, in accordance with the prior art.
Figure 1B:
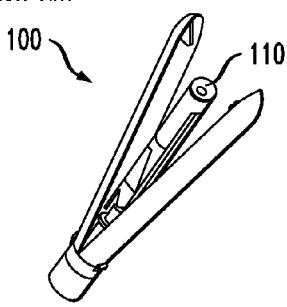
Figure 1A:
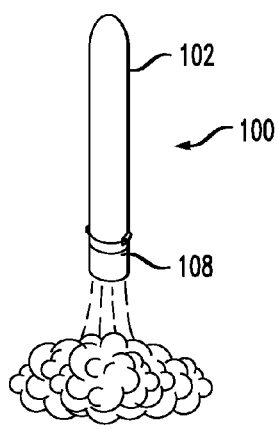
Figure 2C:
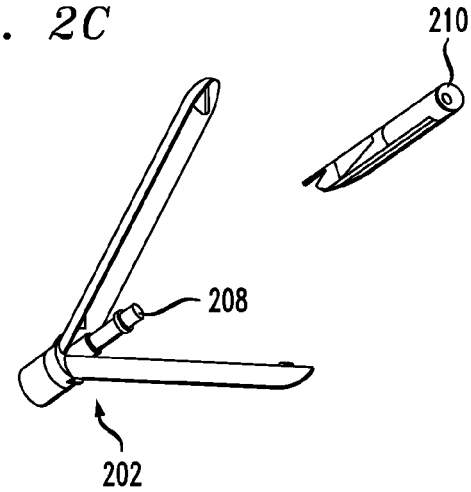
FIGS. 2A through 2C depict the deployment of a payload from a capsule, wherein the capsule contains a payload-ejection mechanism in accordance with the illustrative embodiment of the present invention.
Figure 2B:
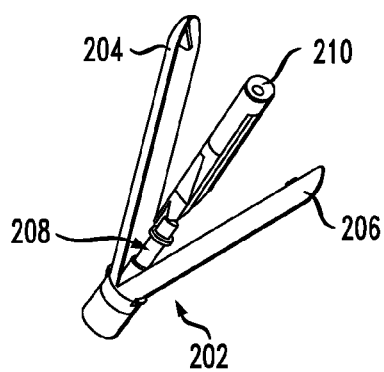
Figure 2A:
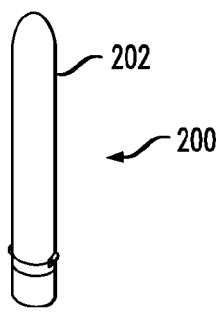

FIG. 2A depicts the launch of capsule 200, wherein the capsule contains payload-ejection mechanism 208 (see, e.g., FIGS. 2B and 2C) in accordance with the illustrative embodiment of the present invention. The capsule can be launched via a "hot launch" technique, such as by using a booster. Alternatively, capsule 200 can be launched via various "cold launch" techniques, including pressurized gas, electromagnetics, and the like. The manner in which capsule 200 is not germane to an understanding of the invention and those skilled in the art will be able to design and implement a suitable launch system for launching capsule 200.

Figure 3:
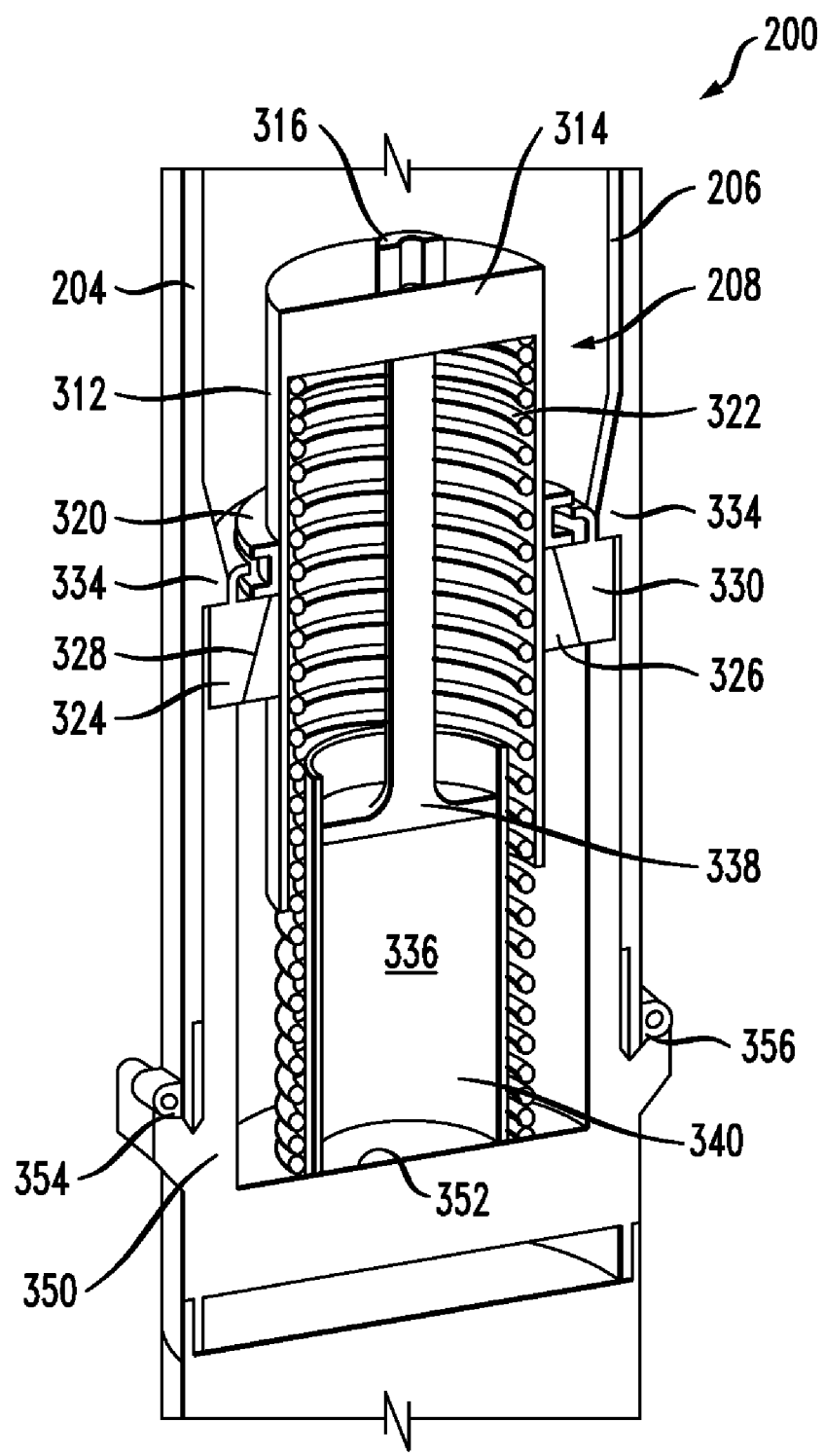
FIG. 3 depicts details of a payload ejection mechanism in accordance with the illustrative embodiment of the invention.
Figure 4:
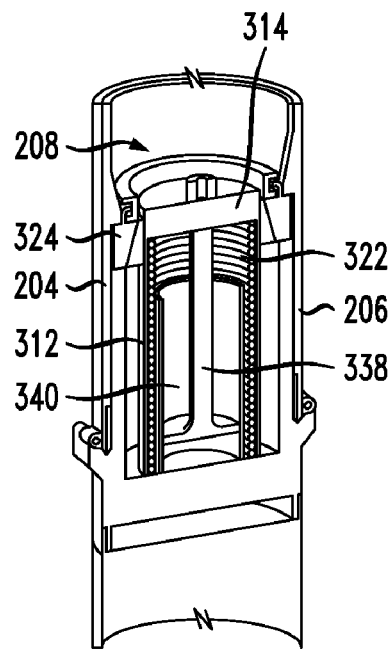
FIG. 4 depicts the payload ejection mechanism after an energy-storing element has absorbed energy during launch of a capsule that contains the payload ejection mechanism and a payload.

As described further in conjunction with FIGS. 3 and 4, payload-ejection mechanism 208 within capsule 200 includes an energy-storing element. The energy-storing element stores some of the energy of launch. In the illustrative embodiment, energy is stored by compressing a resilient member.

At some predetermined altitude or time after launch, capsule 200 opens in preparation for deploying payload 210, as depicted in FIG. 2B. Shell 202 of capsule 200 is adapted to separate into two or more segments 204 and 206 to enable deployment. Explosive bolts or other such devices are used to open shell 202 in known fashion.

In accordance with the illustrative embodiment, while shell 202 remains closed, the energy-storing element is restrained from releasing its energy. The opening of shell 202 releases a locking mechanism, which, in turn, enables the compressed resilient member to return to its uncompressed state. As it does so, the launch energy stored in the resilient member is converted to kinetic energy; that is, the movement of the resilient member.

Payload 210 is operably coupled to the resilient member and, as a consequence, some of the kinetic energy of the re-expanding resilient member is imparted to payload 210. The payload is propelled away from open shell 202, as depicted in FIG. 2C, as a result of this energy transfer.

FIG. 3 depicts detail of payload-ejection mechanism 208 within capsule 200. FIG. 3 depicts the payload-ejection mechanism in a pre-launch state. The portion of capsule 200 that is depicted in FIG. 3 shows capsule housing 340 and the lower portion of shell segments 204 and 206. As depicted in FIG. 3, shell segments 204 and 206 are pivotably coupled to capsule housing 350 at hinges 354 and 356. Payload 210 is not depicted for the sake of clarity.

Payload-ejection mechanism 208, which is disposed within and extending from capsule housing 350, includes movable housing 312, housing restraint 320, energy-storing element 322, locking mechanism 324, lock restraint 334, and damping system 336, interrelated as shown.

Movable housing 312 is a cylindrical wall that terminates, at its upper end, in platform 314. Coupling 316 is disposed on top of platform 314 for engaging a complementary coupling (not depicted) that depends from payload 210. These couplings enable the payload to be positively restrained for pre-launch activities (e.g., transportation, etc.). At launch, or as the shell opens, the coupling is released so that payload 210 is able to separate from capsule 200. The couplings can be decoupled via explosive bolts or other mechanisms.

Energy-storing element 322 comprises a resilient member. In the illustrative embodiment, the resilient member is a coil spring. In some further embodiments, the resilient member comprises a resilient material (e.g., rubber, etc.), but is not in the form of a coil spring.

Energy-storing element 322 is disposed beneath movable housing 312. In the illustrative embodiment, the upper end of energy-storing element 322 abuts the lower surface of platform 314. The lower end of energy-storing element 322 contacts base 352 of capsule housing 350.

In the illustrative embodiment, locking mechanism 324 is implemented as a "collar" or toroid that encircles a portion of movable housing 312. The locking mechanism is seated on the upper edge of capsule housing 350. The collar comprises inner circular wedge 326, outer circular wedge 330, and resilient layer 328, the latter sandwiched between the inner and outer circular wedges. Inner circular wedge 326 abuts the surface of movable housing 312.

Locking mechanism is a "one-way" mechanism such that, when engaged as in FIG. 3, it permits movement of movable housing 312 in only one direction. In particular, locking mechanism 324 permits movable housing 312 to move "downward," when urged, into capsule housing 350. The engaged locking mechanism will not, however, permit movement of movable housing 312 "upward," out of capsule housing 350.

In some embodiments, this one-way behavior is provided by providing ridges and grooves (not depicted) on facing surfaces of locking mechanism 324 and movable housing 312. The ridges and grooves on the inner surface of inner circular wedge 326 are angled downward toward base 352 of capsule housing 350. The ridges and grooves on the outer surface of movable housing 312 are angled upward. As a consequence, and with the application of sufficient force, the upward-facing ridges on the outer surface of movable housing 312 will "slide" over the downward facing ridges on the inner surface of inner circular wedge 326. Resilient layer 328 between the two wedges facilitates sufficient "play" at the interface of the wedge 326 and movable housing 312 to enable this movement. As a ridge on the outer surface of movable housing 312 slides over a ridge on the facing surface of inner circular wedge 326, it seats in a downward-facing groove (on the inner surface of inner circular wedge 326). Consequently, movement in the reverse direction is prevented.

As described later in conjunction with FIG. 4, in the absence of some form of restraint for locking mechanism 324, energy-storing element would not be able to store energy. To this end, lock restraint 334 is provided. The lock restraint, when engaged, prevents locking mechanism from moving upward.

In the illustrative embodiment, lock restraint 334 is implemented as inward-extending ridge on the inner surface of shell segments 204 and 206. When the shell segments are closed, the ridge overlies locking mechanism 324 such that it is prevented from moving upward.

Housing restraint 320 is disposed on inner wedge 326 of locking mechanism 324. When engaged, housing restraint 320 restrains movable housing 312 from moving. Typically, housing restraint 320 is engaged for pre-launch activities. When launch of capsule 200 is imminent, housing restraint is released. As discussed in conjunction with FIG. 4, release of housing restraint 320 enables damping system 336 and energy-storing element to function. Housing restraint 320 can be released by firing explosive bolts, etc.

Damping system 336 is disposed beneath and operably engaged to movable housing 312. In the illustrative embodiment, damping system 336 comprises piston 338 and cylinder 340.

The upper end of piston 338 abuts the lower surface of platform 314 of movable housing 312. The lower circular portion of piston 338 extends into underlying cylinder 340. The cylinder is disposed on base 352 of capsule housing 350.

In the illustrative embodiment, locking mechanism 324, movable housing 312, energy-storing element 322, piston 338, and cylinder 340 are co-axial with respect to one another.

As previously noted, FIG. 3 depicts payload-ejection mechanism 208 in a pre-launch state. On the other hand, FIG. 4 depicts payload-ejection mechanism 208 directly after launch and before shell segments 204 and 206 have opened. Although it is not shown for the sake of clarity, payload 210 is understood to be resting on platform 314.

During launch, capsule 200 is accelerated upward rapidly. The presence of payload 210 on platform 314 forces the movable housing 312 downward. This forces piston 338 into cylinder 340, which provides shock absorption for payload 210. At the same time that the piston is driven into the cylinder, energy-storing element 322 is compressed. Locking mechanism 324 maintains the compression of energy-storing element 322 until shell segments 204 and 206 separate.

Figure 5:
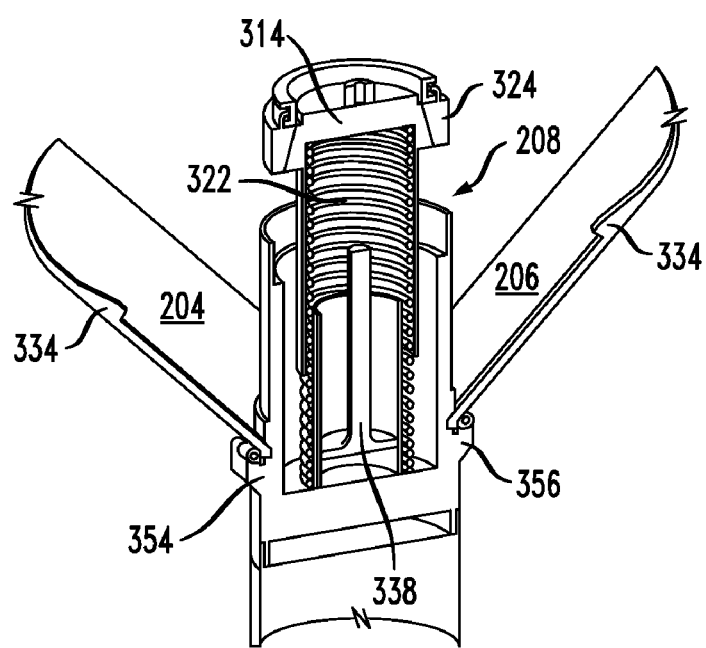
FIG. 5 depicts the payload ejection mechanism after release of the energy that is stored in the energy-storing element.

FIG. 5 depicts payload-ejection mechanism 208 after shell segments 204 and 206 separate. As depicted in FIG. 5, the capsule opens as shell segment 204 pivots about hinge 354 and shell segment 206 pivots about hinge 356. As this occurs, lock restraint (ridge) 334 loses contact with locking mechanism 324. Once this occurs, energy-storing element 322 is free to return to its uncompressed state, which it does. As this occurs, payload 210 is propelled forward, or capsule 200 is propelled backward (i.e., slowed), as a function of the relative masses of the payload and the capsule. In either case, the separation distance between payload 210 and capsule 200 is increased.

As previously indicated, piston 338 is operably engaged to platform 314 in the sense that when the platform moves downward, the piston is likewise forced downward. In the illustrative embodiment, piston 338 is not affixed to platform 314, so that when energy-storing element 322 expands, piston 338 does not travel with platform 314. If piston 338 and platform 314 were affixed to one another, the piston would withdraw from the cylinder when energy-storing element 322 expands. The latter scenario is disadvantageous since this would reduce the velocity of expanding energy-storing element, thereby providing a reduced impulse to payload 210 (or capsule 200).

FIG. 6 depicts method 600 in accordance with the illustrative embodiment. As depicted in FIG. 6, method 600 includes the operations of:
- 602: compressing the resilient member in response to an accelerating force that accelerates the capsule;
- 604: advancing the piston into the cylinder in response to the accelerating force, wherein the compressing and advancing operations occur substantially simultaneously;
- 606: maintaining compression of the resilient member until the shell of the capsule opens;
- 608: opening the shell, wherein opening the shell causes the release of compression of the resilient member.

It is to be understood that the above-described embodiments are merely illustrative of the present invention and that many variations of the above-described embodiments can be devised by those skilled in the art without departing from the scope of the invention. For example, in this Specification, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the specification to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Specification are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed:
1. An apparatus comprising:
a damping system;
an energy-storing element, wherein energy is stored within said energy-storing element via compression of a resilient member; wherein:
(1) in response to a first force, said damping system provides damping action and said energy-storing element stores energy; and
(2) said damping system and said energy-storing element are configured so that, in response to said first force, said damping action and the storing of energy occurs substantially simultaneously; and a locking mechanism for maintaining compression of said resilient member, wherein the locking mechanism comprises a collar having an inner circular wedge, an outer circular wedge, and a resilient layer disposed therebetween.

2. The apparatus of claim 1 further comprising a payload, wherein said payload is operatively coupled to said damping system and said energy-storing element, and further wherein the locking mechanism permits only one-way movement of a movable housing that is coupled thereto.

3. The apparatus of claim 2 further comprising a shell, wherein said payload, said damping system, and said energy-storing element are disposed within said shell.

4. The apparatus of claim 3 wherein said apparatus is a launch capsule, and wherein said shell comprises at least two portions that are separable from one another.

* * * * *